US00RE36324E

United States Patent [19]

Yoda et al.

[11] E Patent Number: Re. 36,324

[45] Reissued Date of Patent: Oct. 5, 1999

[54] HOPPER CONVERTIBLE MATERIAL CONTAINER

[75] Inventors: Tsukasa Yoda; Kazuyuki Okubo; Kenji Urasawa, all of Sakaimachi, Japan

[73] Assignee: Nissei Plastic Industrial Co., Ltd., Japan

[21] Appl. No.: 08/768,425

[22] Filed: Dec. 18, 1996

Related U.S. Patent Documents

Reissue of:

[64] Patent No.: 5,513,777
Issued: May 7, 1996
Appl. No.: 08/266,429
Filed: Jun. 27, 1994

[30] Foreign Application Priority Data

Jun. 30, 1993 [JP] Japan ..... 5-041175 U
Apr. 26, 1994 [JP] Japan ..... 6-109179

[51] Int. Cl.[6] ..... B65D 88/54

[52] U.S. Cl. ..... 222/325; 222/561; 141/364

[58] Field of Search ..... 222/146.2, 185, 222/325, 413, 561, 568, 461, 462; 425/578, 585; 141/364

[56] References Cited

U.S. PATENT DOCUMENTS

| | | | |
|---|---|---|---|
| 2,604,659 | 7/1952 | Eppler | 222/413 |
| 4,105,147 | 8/1978 | Stubbe | 222/413 |
| 4,133,460 | 1/1979 | Jerpbak | 222/413 |
| 4,266,694 | 5/1981 | Hehl | 222/413 |
| 4,901,890 | 2/1990 | Mivelaz | 222/325 |
| 5,089,854 | 2/1992 | Kaieda et al. | 141/364 |
| 5,096,302 | 3/1992 | Durina | 366/76 |

FOREIGN PATENT DOCUMENTS

| | | | |
|---|---|---|---|
| 2255080 | 10/1992 | United Kingdom . | |
| 91006497 | 5/1991 | WIPO | 222/325 |

*Primary Examiner*—Philippe Derakshani
*Attorney, Agent, or Firm*—Ostrolenk, Faber, Gerb & Soffen, LLP

[57] ABSTRACT

A material feeding apparatus including a material container as a hopper serves to feed a molding material sealably received in the material container to a molding machine via a heating sleeve. The material feeding apparatus includes as essential components a material container molded of a transparent synthetic resin or a translucent synthetic resin so as to enable a quantity of molding material remaining in the material container to be visually confirmed from the outside, and an adapter of which one end is formed in the shape of an open end part to be threadably fitted into an opening portion *of the outer wall* of the material container and of which the other end is formed in the shape of an open end part to be fitted onto a receiving member of the molding machine. To openably shut the interior of the material container, a shutter is slidably displaceably arranged in the adapter. In practical use, the material container is fitted onto the receiving member via the adapter while assuming an inverted attitude in order to serve also as a hopper. Since the small-sized material container having the molding material sealably received therein can be used as a hopper, a material controlling operation and a material exchanging operation can be achieved at a high speed without any necessity for drying the molding material prior to each molding operation.

13 Claims, 3 Drawing Sheets

HOPPER CONVERTIBLE MATERIAL CONTAINER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a material feeding apparatus including a material container as a hopper for a synthetic resin molding machine, especially, a small-sized molding machine wherein a material to be molded (hereinafter referred to as a molding material), i.e., a synthetic resin is sealably contained in the material container.

2. Background Art

When a molding material is shipped from a manufacturer to users, containers or bags each having a comparatively large volumetric capacity are generally used. Prior to each molding operation, a user relocates the molding material to a hopper, and subsequently, on completion of the relocating operation, the molding machine is driven to successively perform molding operations.

In the circumstances as mentioned above, in the case that a small quantity of molding material is consumed during each molding operation such as production of small lots of many kinds of molded articles, on a molding operation test or a trial molding operation is performed for a new molding die, useless consumption of the molding material is liable to occur. In addition, since the molding material once delivered to a user absorbs moisture while it is kept in storage, it is rarely used for molding operations directly from storage. This leads to the result that it is necessary that most of the molding material is dried directly before each molding operation is performed. For this reason, the molding operation can not be started until the molding material is completely dried, resulting in the efficiency of each molding operation being adversely affected.

SUMMARY OF THE INVENTION

The present invention has been made in consideration of the aforementioned background.

An object of the present invention is to provide a material feeding apparatus including as a hopper a container having a predetermined volume of molding material sealably received therein wherein the material feeding apparatus assures that the material container can be used as a hopper as it is under the condition that an adaptor is employed for the material feeding apparatus with the result that a material controlling operation and a material relocating operation can be achieved at a high speed, and moreover, a drying time is not required.

Another object of the present invention is to provide a material feeding apparatus of the foregoing type which assures that the material container is molded of a transparent synthetic resin so as to enable a quantity of molding material remaining in the material container serving as a hopper to be visually confirmed as seen in any direction.

To accomplish the above objects, the present invention provides a material feeding apparatus including a material container as a hopper, wherein the material feeding apparatus comprises a material container molded of a synthetic resin so as to allow a material to be molded to be sealably received therein and an adapter having a shutter interposed between a funnel-shaped portion and a connecting portion for openably shutting the interior of said material container, the upper end part of the funnel-shaped portion being formed in the shape of an open end part to be threadably engaged with a plurality of female threads formed around the inner wall surface of an opening portion of the material container, and the lower end pan of the connecting portion being formed in the shape of an opening portion to be fitted onto a receiving member of the molding machine, whereby after a seal is peeled off from the material container, the adapter is threadably fitted into the opening portion of the material container, while the material container is fitted onto the receiving member with an inverted attitude via the adapter so as to allow the material container to serve also as a hopper.

A characterizing feature of the material feeding apparatus constructed in accordance with the present invention consists in that the material container is molded of a transparent synthetic resin or a translucent synthetic resin. The synthetic resin preferably employable for molding the material container is exemplified by polyethylene terephthalate resin, polycarbonate resin and polypropylene resin, each of which is a single kind of synthetic resin capable of being molded by employing a stretch blow-molding process. In some cases, the molding material may be a composite component including an intermediate layer made of an ethylene-vinyl acetate copolymer (EVA) having an excellent gas barrier property.

A container molded with a wide pouring port and a volumetric capacity ranging from 1.0 to 20.0 liters by employing a stretch blow-molding process can be employed as a material container for the material feeding apparatus as it is, and an opening portion of the material container can sealably be closed with conventional sealing means such as a metal seal, a screw cap or the like.

With such construction, since the material container is mounted as a hopper on a molding machine with an adapter attached thereto, a predetermined quantity of molding material received in the material container can be fed to the molding machine via a feeding port formed through the receiving member by opening the shutter. In addition, since the molding material sealably received in the material container is kept dry, there does not arise a necessity for drying the molding material prior to each molding operation, and moreover, it is possible to exchange the present material container having a certain quantity of molding material received therein with another one having the other kind of molding material received therein.

Thus, the material feeding apparatus can be designed and constructed with small dimensions so that a predetermined quantity of molding material can be fed to the molding machine corresponding to the number of products to be molded, whereby each molding operation can be achieved with a reduced quantity of material loss regardless of the kind of molding operation such as a molding operation to be performed for producing many kinds of molded articles in a small production lot, a molding operation test or a trial molding operation to be performed when the currently used molding die is exchanged with other one. In addition, since the currently used material container can easily be exchanged with other one, the currently used molding material can quickly be exchanged with the other kind of molding material. Additionally, since the dried molding material can be fed directly from the material container, no drying operation is required, resulting in the stored state of the molding material being easily controlled.

Further, since the material container is molded of a transparent synthetic resin or a translucent synthetic. resin, it is not necessary to dispose a transparent window on the material container for visually confirming the stored state of the molding material. In other words, since the interior of the material container can visually be observed in any direction, the of conventional operation for visually confirming a quantity of molding material remaining in the material container through a transparent window is not required Thus, the quantity of molding material remaining in the material container can easily be confirmed from a position located remote from the hopper.

In view of the fact that the time required for drying the molding material prior to each molding operation can be eliminated, the currently used molding material can simply be exchanged with the other kind of molding material, and loss of the molding material can be reduced, each molding operation can be achieved not only at an improved efficiency but also at a reduced cost. Especially, in the case that a small number of molded articles are produced using a different kind of molding material, advantageous effects obtainable from the material feeding apparatus constructed in accordance with the present invention become more remarkable.

Since the material container can be molded with a small thickness and a light weight by employing a stretch blow-molding process, it exhibits an excellently high strength at the time of a drop test, and moreover, it can be produced at an inexpensive cost. In addition, after the material container becomes empty due to complete consumption of the molding material received therein, it can be reused as it is by recovering it from the molding machine.

Other objects, features and advantages of the present invention will become apparent from reading of the following description which has been made in conjunction with the accompanying drawings.

DETAILED DESCRIPTION OF THE PREFERRED EMBODIMENTS

Figure 1:
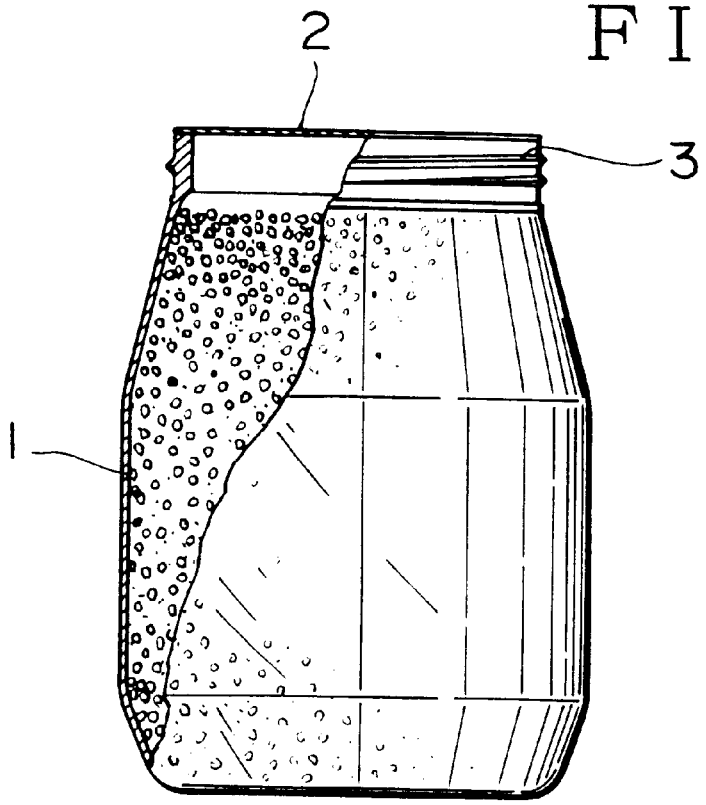
FIG. 1 is a partially exploded front view of a material container usable as a hopper for a material feeding apparatus constructed in accordance with an embodiment of the present invention.
Figure 2:
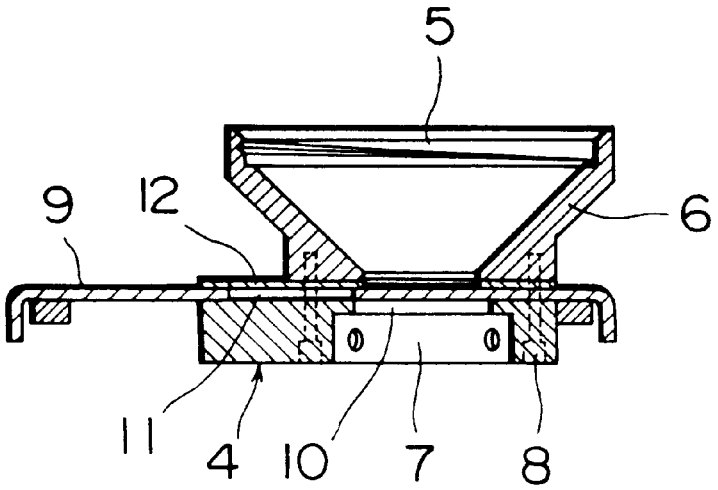
FIG. 2 is a vertical sectional view of an adapter employable for the material feeding apparatus of the present invention.

The present invention will now be described in detail hereinafter with reference to the accompanying drawings which illustrate preferred embodiments thereof.

In the drawings, reference numeral 1 designates a transparent material container molded of a polyethylene terephthalate resin to form a wide opening portion while assuming a volumetric capacity of 1.5 to 3.0 liters by employing an injection stretch blow-molding process. A few male threads 3 are formed around the outer peripheral surface of the opening portion of the material container 1. The opening portion of the material container 1 is sealably closed with a metal seal 2. As desired, the material container can be used as a packing container by threadably fitting a screw cap (not shown) to the male threads 3 when a material received in the material container is to be commercially sold.

Reference numeral 4 designates an adapter made of a metallic material. The adapter 4 is composed of a funnel-shaped portion 6 including an opening portion having a few female threads formed around the inner wall surface of an open end part 5 thereof and a connecting portion 8 having a plurality of screw holes formed therethrough. An open end part 7 adapted to be fitted onto a receiving member of a heating sleeve of a molding machine (to be described later) is formed in the lower end part of the connecting portion 8, and the funnel-shaped portion 6 and the connecting portion 8 are integrated with each other by tightening a plurality of screws while a shutter 9 is interposed therebetween so as to openably shut the interior of the funnel-shaped portion 6 therewith.

The shutter 9 is designed in the form of a plate having a communication hole 11 formed therethrough to make communication between the open end part 5 of the funnel-shaped portion 6 and the open end part 7 of the connecting portion 8 via a communication hole 10, and a guide plate 12 is brought in slidable contact with the lower surface of the shutter 9 so as to allow the latter to be slidably displaced along the lower surface of the guide plate 12. In other words, the shutter 9 is slidably disposed between the connecting portion 8 and the guide plate 12.

Figure 3:
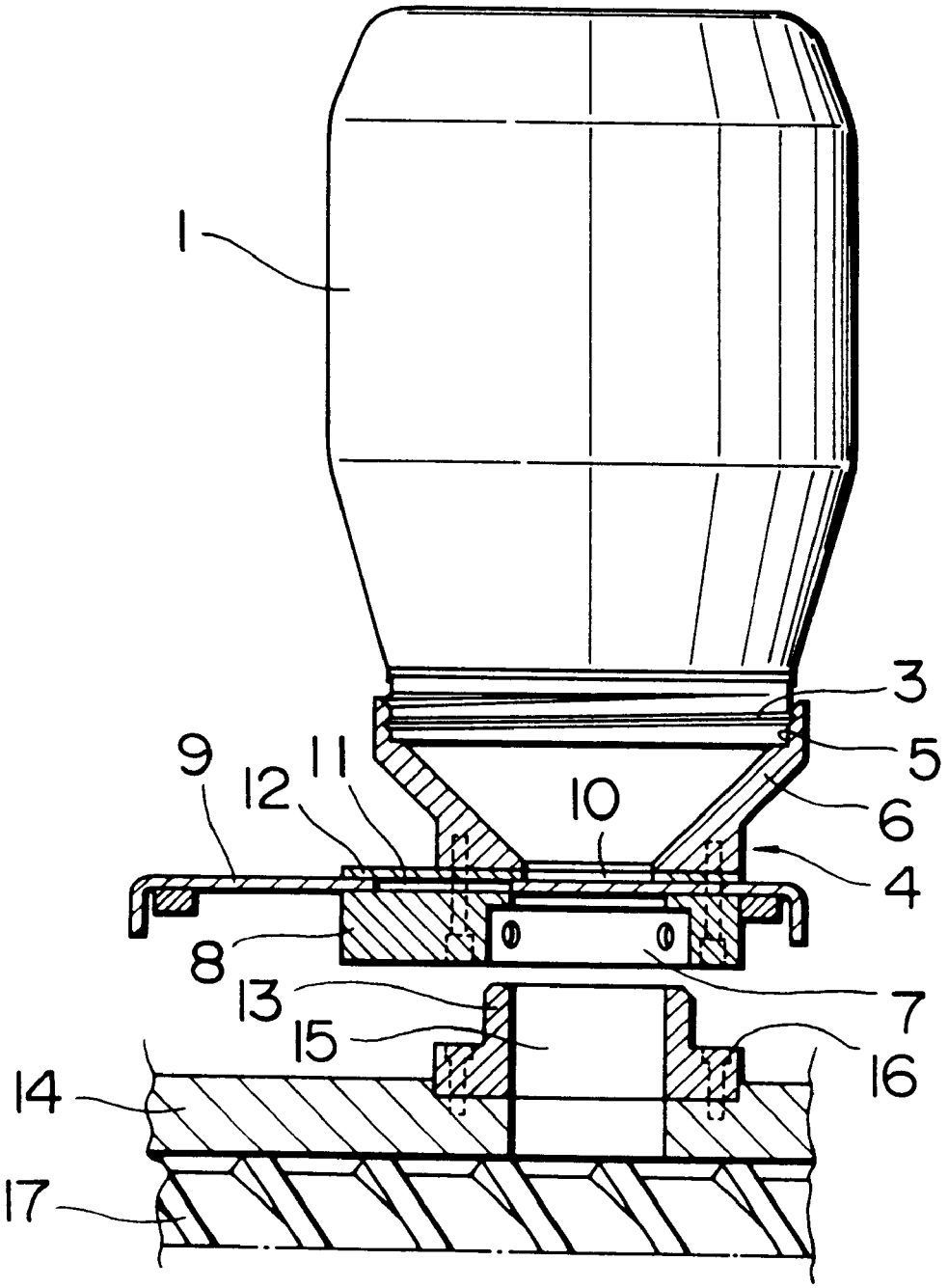
FIG. 3 is a vertical sectional front view of the material feeding apparatus of the present invention, showing in the disassembled state that the material container is threadably fitted into the adapter.

In FIG. 3, reference numeral 13 designates a receiving member disposed on a heating sleeve 14 for the molding machine. A feeding port 15 is formed through the receiving member 13, and a stepped part 16 adapted to allow the open end part 7 of the connecting portion 8 to be fitted onto the receiving member 13 is formed outside of the receiving member 13. Reference numeral 17 designates a screw for plasticizing the molding material.

When the material container 1 is to be mounted on the heating sleeve 14 for the molding machine, first, the metal seal 2 is peeled off from the opening portion of the material container 1, and subsequently, the adapter 4 is fitted to the material container 1. At this time, this fitting is achieved by threadably engaging the female threads at the open end part 5 of the funnel-shaped portion 6 with the male threads 3 at the open end part of the material container 1. Next, it is confirmed that the interior of the adapter 4 is kept closed by the shutter 9, and thereafter, the material container 1 is turned upside down as shown in FIG. 3 so as to allow the adapter 4 to be located above the receiving member 13. The open end part 7 of the connecting portion 8 is fitted onto the receiving member 13 to come in contact with the stepped part 15, and thereafter, a screw (not shown) is threadably fitted to the connecting portion 8 from one side until the adapter 4 is firmly secured to the receiving member 13. Now, the material container 1 can serve also as a hopper so as to enable a molding material to be fed into the heating sleeve 14 by opening the shutter 9.

Figure 4:
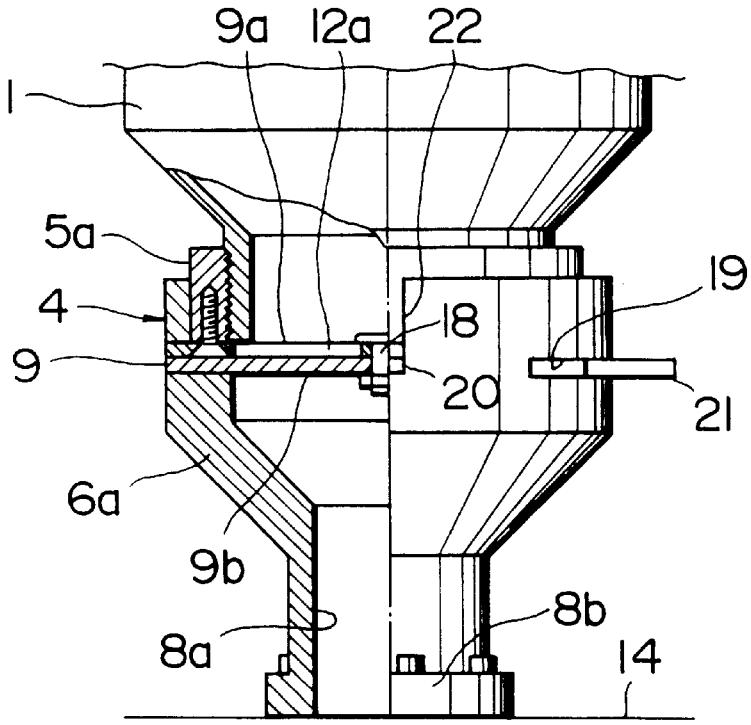
FIG. 4 is a partially exploded front view of a material feeding apparatus constructed in accordance with another embodiment of the present invention.
Figure 5:
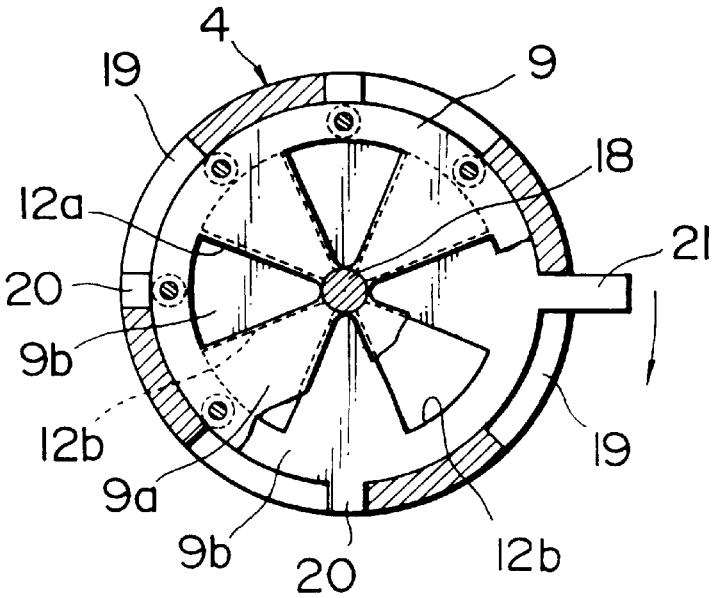
FIG. 5 is a sectional plan view of the material feeding apparatus shown in FIG. 4.

FIG. 4 and FIG. 5 show a material feeding apparatus constructed in accordance with another embodiment of the present invention, respectively. In this embodiment, an adapter 4 is composed of a funnel-shaped portion 6a and a cylindrical joint portion 8a integrated with the funnel portion 6a below the latter, and a shutter 9 is placed on the upper wall surface of the funnel-shaped portion 6a. A material container 1 is fitted to the adapter 4 with an inverted attitude by threadably engaging a plurality of female threads formed around the inner wall surface of a threaded ring 5a received in the open end part of the funnel-shaped portion 6a with a plurality of male threads formed around the outer peripheral surface of the open end part of the material container 1.

The adapter 4 is mounted on the heating sleeve 14 for the molding machine by bolting a flange 8b integrated with the open end part of the connecting portion 8a to the periphery of a feeding port (not shown) of the heating sleeve 4, whereby the adapter 4 constitutes a hopper in cooperation with the material container 1.

The shutter 9 is composed of two upper and lower circular plates 9a and 9b having radially extending sector-shaped openings 12a and 12b formed therethrough in the equally spaced relationship as seen in the circumferential direction, and central parts of the circular plates 9a and 9b are rotatably fitted onto a shaft 18 so as to allow the circular plates 9a and 9b to rotate relative to each other. The peripheral part of the upper circular plate 9a is fixedly secured to the adapter 4 by tightening a plurality of screws. On the other hand, pawl pieces 20 projecting outside of the periphery of the lower circular plate 9b are inserted into four circumferentially extending elongated slits 19 via four vertically extending grooves 22, causing the lower circular plate 9b to be rotatably supported in the adapter 4 to rotate relative to the upper circular plate 9a in order to open or close the sector-shaped opening portions 12a and 12b relative to each other. One of the four pawl pieces 20 is radially projected outside of the lower circular plate 9b so as to serve as an actuating piece 21 for opening or closing the shutter with an operator's hand.

It should be noted that fitting of the adapter 4 to the material container 1 may be achieved by matching projected parts with the corresponding recessed parts, and moreover, fitting of the adapter 4 to the heating sleeve 14 may be achieved by inserting projected parts of the adapter 4 into the corresponding recessed parts on the heating sleeve 14 side. Although not illustrated, the fitting of the adapter 4 to the material container 1 by way of a fitting operation may be attained by disposing a receiving plate having slide grooves formed on the opposite sides of the receiving member at the upper end of the latter, inserting into the slide grooves slide plates projected downward of the lower end of the adapter on the opposite sides of the latter from one side and then fixedly securing the slide plates to the receiving member by tightening a plurality of screws.

While the present invention has been described above with respect to two preferred embodiments thereof, it should of course be understood that the present invention should not be limited only to these embodiments but various change or modification may be made without departure from the scope of the present invention as defined by the appended claims.

What is claimed is:

1. A material feeding apparatus including a material container as a hopper, comprising:

a material container molded of a synthetic resin so as to allow a material to be molded to be sealably received therein and an adapter having a shutter interposed between a funnel-shaped portion and a connecting portion for openably shutting the interior of said material container, the upper end part of said funnel-shaped portion being formed in the shape of an open end part to be threadably engaged with a plurality of [female] threads formed around the [inner] *outer* wall surface of an opening portion of said material container, and the lower end part of said connecting portion being formed in the shape of an opening portion to be fitted onto a receiving member of a molding machine, whereby the adapter is threadably fitted into said opening portion of said material container, while said material container is fitted onto said receiving member with an inverted attitude said adapter so as to allow said material container to serve also as a hopper for the molding machine, and wherein said adapter is made of a metallic material and includes a first portion having an inner funnel-shaped surface or which one end is formed in the shape of an open end part adapted to be threadably fitted onto said opening portion of said material container and a second portion having a plurality of screw holes formed therethrough so as to allow a plurality of screws to be inserted through said screw holes, the other end of said portion being formed in the shape of an open end part to be fitted onto said receiving member on the injection machine side, and wherein said shutter is interposed between said first portion and said second portion both of which are integrated with each other by tightening said screws.

2. The material feeding apparatus as claimed in claim [1] *11*, wherein said material container is molded of a synthetic resin or a translucent synthetic resin.

3. The material feeding apparatus as claimed in claim 2, wherein said material container is molded of a polyethylene terephthalate resin by employing a stretch blow-molding process.

4. The material feeding apparatus as claimed in claim 2, wherein said material container is molded of a polycarbonate resin by employing a stretch blow-molding process.

5. The material feeding apparatus as claimed in claim 2, wherein said material container is molded of a polypropylene resin by employing a stretch blow-molding process.

6. The material feeding apparatus as claimed in claim 2, wherein said material container is molded of a polyethylene terephthalate resin in the form of a composite article by employing a stretch blow-molding process said composite article including an intermediate layer made of an ethylenevinyl acetate copolymer.

7. The material feeding apparatus as claimed in claim 2, wherein said shutter is composed of two upper end lower circular plates each having a plurality a radially extending openings, the central part of each of said circular plates being rotatably supported to rotate about a shaft the periphery of said upper circular place is fixedly secured to the wall surface of said adapter by tightening a plurality of screws, and said lower circular plate is rotatably supported on the upper wall surface of said funnel-shaped portion of said adapter so as to open or close said radially extending openings relative to said radially extending openings of said upper circular place, said lower circular plate including a plurality of pawl pieces projected outside of the periphery thereof, each of said pawl pieces being inserted into the corresponding circumferentially extending elongated slit formed on the upper wall surface of said funnel-shaped portion via the corresponding vertical groove.

8. A material feeding apparatus including a material container as a hopper, comprising:

a material container molded of a synthetic resin so as to allow a material to be molded to be sealably received therein and an adapter having a shutter interposed between a funnel-shaped portion and a connecting portion for openably shutting the interior of said material container, the upper end part of said funnel-shaped portion being formed in the shape of an open end part to be threadably engaged with a plurality of [female] threads formed around the inner wall surface of an opening portion of said material container, and the lower end part of said connecting portion being formed in the shape of an opening portion to be fitted onto a receiving member of a molding machine, whereby the adapter is threadably fitted into said opening portion of said material container, while said material container is fitted onto said receiving member with an inverted attitude said adapter so as to allow said material container to serve also as a hopper for the molding machine, and wherein said adapter is composed of a funnel-shaped portion and a cylindrical connecting portion located below said funnel-shaped portion with said shutter placed on the upper wall of said funnel-shaped portion, said material container is threadably fitted into a threaded ring disposed on the open end part of said funnel-shaped portion with an inverted attitude, and said adapter is mounted on a heating sleeve or a molding machine by fixedly securing the open end part of said connecting portion to the periphery of a feeding port for said heating sleeve by tightening a plurality of bolts.

9. The material feeding apparatus as claimed in claim [8] *12*, wherein said shutter is composed of two upper and lower circular plates each having a plurality [a] *of* radially extending circular plates each having a plurality a radially extending openings, the central part of each of said circular plates being rotatably supported to rotate about a shaft, the periphery of said upper circular plate is fixedly secured to the wall surface of said adapter by tightening a plurality of screws, and said lower circular plate is rotatably supported on the upper wall surface of said funnel-shaped portion of said adapter so as to open or close said radially extending openings relative to said radially extending openings of said upper circular plate, said lower circular plate including a plurality of pawl pieces projected outside of the periphery thereof, each of said pawl pieces being inserted into the corresponding circumferentially extending elongated slit formed on the upper wall surface of said funnel-shaped portion via the corresponding vertical groove.

10. A material feeding apparatus including a material container as a hopper, comprising:

a material container molded of a synthetic resin so as to allow a material to be molded to be sealably received therein and an adapter having a shutter interposed between a funnel-shaped portion and a connecting portion for openably shutting the interior of said material container, the upper end part of said funnel-shaped portion being formed in the shape of an open end part to be threadably engaged with a plurality of [female] threads formed around the inner wall surface of an opening portion of said material container, and the lower end part of said connecting portion being formed in the shape of an opening portion to be fitted onto a received member of a molding machine, whereby the adapter is threadably fitted into said opening portion of said material container, while said material container is fitted onto said receiving member with an inverted attitude said adapter so as to allow said material container to serve also as a hopper for the molding machine, and wherein said shutter is composed of two upper end lower circular plates each having a plurality a radially extending openings, the central part of each of said circular places being rotatably supported to rotate about a shaft, the periphery of said upper circular plate is fixedly secured to the wall surface of said adapter by tightening a plurality of screws, and said lower circular plate is rotatably supported on the upper wall surface of said funnel-shaped portion of said adapter so as to open or close said radially extending openings relative to said radially extending openings of said upper circular plate, said lower circular plate including a plurality of pawl pieces projected outside of the periphery thereof, each of said pawl pieces being inserted into the corresponding circumferentially extending elongated slit formed on the upper wall surface of said funnel-shaped portion via the corresponding vertical groove.

*11. The material feeding apparatus as claimed in claim 1, wherein the adapter has female threads on the inner wall surface of an open end part.*

*12. The material feeeding apparatus as claimed in claim 9, wherein the adapter has female threads on the inner wall surface of an open end part.*

*13. The material feeding apparatus as claimed in claim 10, wherein the adapter has female threads on the inner wall surface of an open end part.*

* * * * *